United States Patent
Schneider (10) Patent No.: US 12,261,956 B2
(45) Date of Patent: Mar. 25, 2025

(54) LOCALIZED CRYPTOGRAPHIC TECHNIQUES FOR PRIVACY PROTECTION

(71) Applicant: Google LLC, Mountain View, CA (US)

(72) Inventor: Christopher Schneider, London (GB)

(73) Assignee: Google LLC, Mountain View, CA (US)

( * ) Notice: Subject to any disclaimer, the term of this patent is extended or adjusted under 35 U.S.C. 154(b) by 322 days.

(21) Appl. No.: 17/924,599

(22) PCT Filed: Oct. 28, 2021

(86) PCT No.: PCT/US2021/056932
§ 371 (c)(1),
(2) Date: Nov. 10, 2022

(87) PCT Pub. No.: WO2023/075768
PCT Pub. Date: May 4, 2023

(65) Prior Publication Data
US 2023/0299960 A1    Sep. 21, 2023

(51) Int. Cl.
*H04L 9/08* (2006.01)
*G06F 21/10* (2013.01)
*H04L 9/32* (2006.01)

(52) U.S. Cl.
CPC ............ *H04L 9/3221* (2013.01); *G06F 21/10* (2013.01); *H04L 9/0877* (2013.01)

(58) Field of Classification Search
CPC ... H04L 9/3221; H04L 9/0877; H04L 9/3066; H04L 9/3218; H04L 63/04; H04L 9/3234;
(Continued)

(56) References Cited

U.S. PATENT DOCUMENTS

2009/0171966 A1\* 7/2009 Heaven ................... H04L 67/02
709/219
2013/0006866 A1    1/2013 Pendakur et al.
(Continued)

FOREIGN PATENT DOCUMENTS

JP      2511464       6/1996
JP    2012-033088     2/2012
(Continued)

OTHER PUBLICATIONS

International Search Report and Written Opinion in International Appln. No. PCT/US2021/056932, mailed on Jul. 12, 2022, 16 pages.
(Continued)

*Primary Examiner* — Quazi Farooqui
(74) *Attorney, Agent, or Firm* — Fish & Richardson P.C.

(57) ABSTRACT

Methods, systems, and apparatus, including computer programs encoded on computer storage media, for preserving user privacy when selecting content are described. In some aspects, a method includes receiving a data element identifying a set of candidate digital components and, for each candidate digital component, a set of distribution parameters for the candidate digital component. For each candidate digital component, encrypted selection data for the candidate digital component is provided as input to a cryptographic analysis application running in a trusted hardware module of a client device. The encrypted selection data represents the set of distribution parameters for the candidate digital component and is encrypted using a zero-knowledge proof protocol. The cryptographic analysis application is configured to determine a measure of match between the selection data and user attributes of a user of the client device.

20 Claims, 4 Drawing Sheets

(58) Field of Classification Search
CPC . H04L 9/08; G06F 21/10; G06F 21/53; G06F 21/57; G06F 21/60; H04W 12/10
See application file for complete search history.

(56) References Cited

U.S. PATENT DOCUMENTS

| | | | |
|---|---|---|---|
| 2013/0138569 | A1 | 5/2013 | Yan et al. |
| 2017/0277909 | A1 | 9/2017 | Kraemer et al. |
| 2018/0063709 | A1* | 3/2018 | Morrison ............ H04W 12/069 |
| 2018/0183595 | A1 | 6/2018 | Raduchel |
| 2019/0104116 | A1 | 4/2019 | Nayshtut et al. |
| 2019/0312727 | A1 | 10/2019 | Pino et al. |
| 2021/0320951 | A1 | 10/2021 | Treat et al. |

FOREIGN PATENT DOCUMENTS

| | | |
|---|---|---|
| JP | 2015-184594 | 10/2015 |
| JP | 2016-224400 | 12/2016 |
| JP | 2017-010351 | 1/2017 |
| WO | WO 2020100118 | 5/2020 |

OTHER PUBLICATIONS

Tulabandhula et al., "Privacy-preserving targeted advertising" submitted on Oct. 2017, arXiv preprint arXiv:1710.03275, 26 pages.
Yang et al., "Secure Cloud Storage Based on RLWE Problem" IEEE Access, vol. 7, Dec. 2018, 27604-27614.
Notice of Allowance in Japanese Appln. No. 2022-570384, mailed on Nov. 5, 2024, 5 pages (with English translation).
Ding et al., "How to validate the secret of a Ring Learning with Errors (RLWE) key" Cryptology ePrint Archive, 2018, 20 pages.
International Preliminary Report on Patentability in International Appln. No. PCT/US2021/056932, mailed on May 10, 2024, 8 pages.
Office Action in Japanese Appln. No. 2022-570384, mailed on Apr. 1, 2024, 19 pages (with English translation).

* cited by examiner

LOCALIZED CRYPTOGRAPHIC TECHNIQUES FOR PRIVACY PROTECTION

CROSS-REFERENCE TO RELATED APPLICATIONS

This application is a National Stage Application under 35 U.S.C. § 371 and claims the benefit of International Application No. PCT/US2021/056932, filed Oct. 28, 2021, the entirety of which is incorporated herein by reference.

TECHNICAL FIELD

This specification is related to cryptography and data security.

BACKGROUND

There are many cryptographic techniques for preventing unauthorized access to data. Zero-knowledge proofs are cryptographic protocols for heuristically proving that one party knows or has some information without revealing anything about the information itself. For example, a zero-knowledge proof can enable one party to prove to another party that a statement is true without exposing any other information. Ring learning with errors (RLWE) is one use of zero-knowledge proofs.

SUMMARY

In general, one innovative aspect of the subject matter described in this specification can be embodied in methods that include receiving a data element identifying a set of candidate digital components and, for each candidate digital component, a set of distribution parameters for the candidate digital component; for each candidate digital component, providing encrypted selection data for the candidate digital component as input to a cryptographic analysis application running in a trusted hardware module of a client device, where the encrypted selection data represents the set of distribution parameters for the candidate digital component and is encrypted using a zero-knowledge proof protocol, and where the cryptographic analysis application is configured to determine a measure of match between the selection data and user attributes of a user of the client device, and receiving, as an output of the cryptographic analysis application, an encrypted result that indicates the measure of match between the selection data and the user attributes of a user, wherein the encrypted result is encrypted using the zero-knowledge proof protocol; decrypting the encrypted result for each candidate digital component; selecting, from the candidate digital components, a given digital component based on the measure of match for each candidate digital component; and displaying the given digital component. Other embodiments of this aspect include corresponding systems, apparatus, and computer programs, configured to perform the actions of the methods, encoded on computer storage devices.

These and other implementations can each optionally include one or more of the following features. In some aspects, the cryptographic analysis module determines the measure of match between the selection data and user attributes by comparing each data item of the selection data to a corresponding user attribute of the user. In some aspects, the selection data for each candidate digital component includes contextual data for an environment in which a selected digital component will be displayed.

In some aspects, the user attribute data is stored in the trusted hardware module and the user attribute data is encrypted using the zero-knowledge protocol. In some aspects, the set of distribution parameters for each candidate digital component is encrypted using the zero-knowledge proof protocol.

In some aspects, the zero-knowledge proof protocol includes a ring learning with errors protocol. In some aspects, selecting, from the candidate digital components, the given digital component based on the measure of match for each candidate digital component includes selecting the given digital component based on, for each candidate digital component, a combination of the measure of match and a publisher amount.

The subject matter described in this specification can be implemented in particular embodiments so as to realize one or more of the following advantages. The security and privacy of user data is protected by storing the user data in a trusted hardware module of the user's device, or using the trusted hardware module to control access to the user data, rather than sending the user data across a public network, e.g., the Internet, while still allowing such data to be used to customize content displayed to the user, thereby also improving the user experience when viewing digital content. Cryptographic techniques, e.g., zero-knowledge proofs and ring learning with errors, enable the use of such user data while preventing parties other than the user from accessing and gaining knowledge of any of the user's data. Cryptographic techniques including zero-knowledge proofs and ring learning with errors may also prevent users from accessing and gaining knowledge of any of the content selection criteria used to perform the selection. By preventing the user from learning details of the selection criteria the user data may be kept private on the user device but also prevent third parties from determining information about the selection criteria. Performing content selection using these cryptographic techniques on the user's device, e.g., in combination with storing candidate content on the user's device, can reduce latency and bandwidth consumption in displaying an attestable digital component relative to techniques that require such data to be transmitted to remote servers for content selection.

Reducing the latency in content presentation reduces the number of errors that occur at user devices while waiting for such content to be selected and/or arrive from a remote server. As the content often needs to be at the user device and ready for display in hundreds of milliseconds and to mobile devices connected by wireless networks, reducing the latency in selecting and/or providing the content is critical in preventing errors and reducing user frustration. Additionally, reducing the need to transmit data reduces the amount of bandwidth consumed to transmit the information, reduces the latency in transmitting the information, and reduces the amount of processing power and associated battery power for devices running on batteries (e.g., mobile devices) required to transmit the information. The cryptographic techniques described in the document in combination with storing user data and/or candidate content at user devices provide a synergistic effect of improving data security, protecting user privacy, and reducing latency in presenting content at user devices.

Various features and advantages of the foregoing subject matter are described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, this document describes systems and techniques for using cryptography in ways that preserve user privacy in processes for selecting content to display to users. The techniques described in this document allow for such privacy preservation and data security while still providing digital components in short time periods, e.g., within milliseconds, after a request is received. The techniques can include using zero-knowledge proofs to query whether distribution parameters of digital components match attributes of a user (or a measure of match between the distribution parameters and user attributes), without enabling any party other than the user from learning the user attributes. A content selection module can select a digital component to display based on the results of the process being performed for multiple candidate digital components and optionally additional information.

Figure 1:
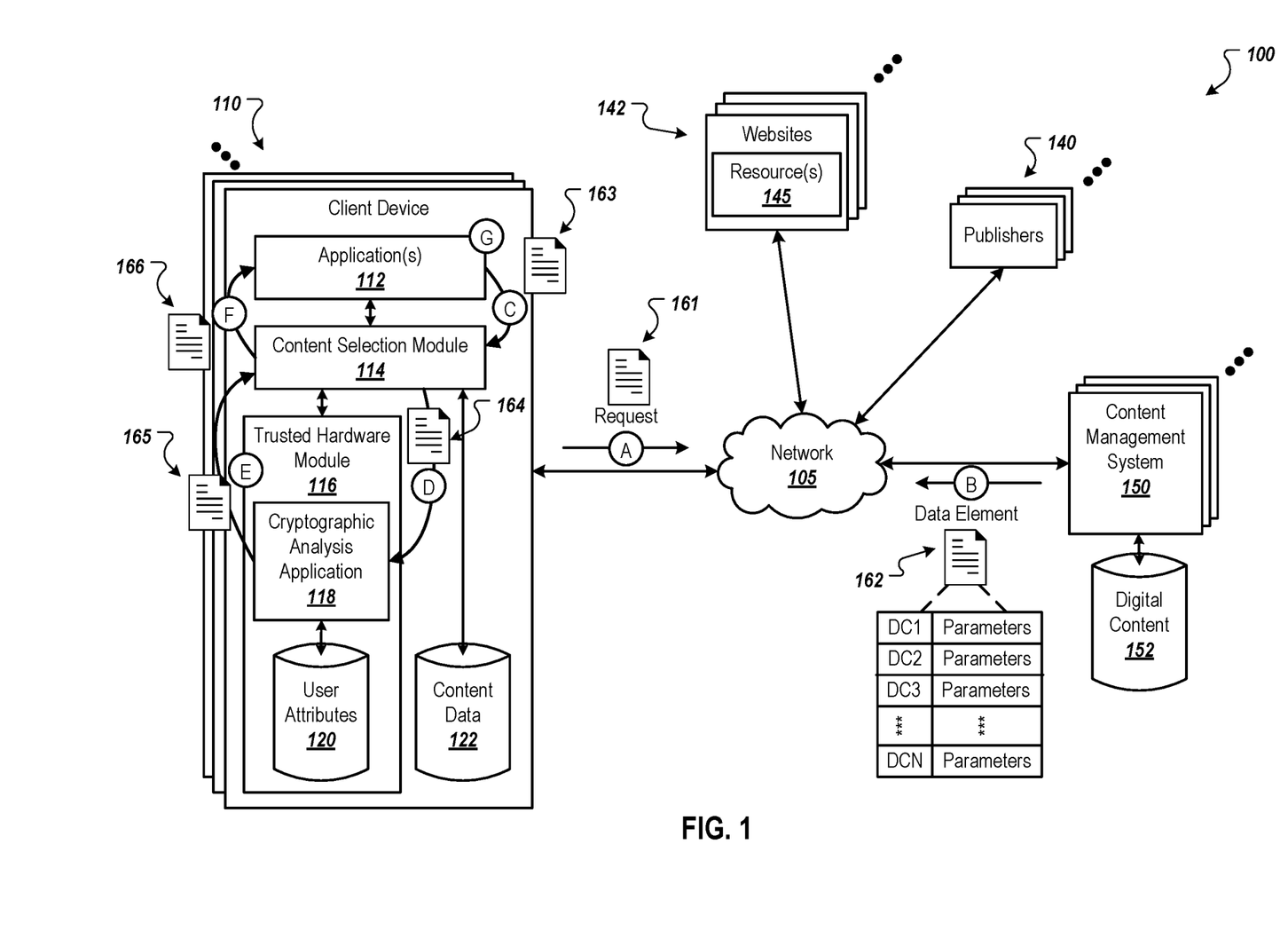
FIG. 1 is a block diagram of an example environment in which client devices display digital content.

FIG. 1 is a block diagram of an example environment 100 in which client devices display digital content. The example environment 100 includes a data communication network 105, such as a local area network (LAN), a wide area network (WAN), the Internet, a mobile network, or a combination thereof. The network 105 connects the client devices 110, publishers 140, websites 142, and a content management system 150. The example environment 100 can include many different client devices 110, publishers 140, websites 142, and content management systems 150.

A website 142 includes one or more electronic resources 145. The resources 145 can be associated with a domain name and hosted by one or more servers. An example website is a collection of web pages formatted in hypertext markup language (HTML) that can contain text, images, multimedia content, and programming elements, such as scripts. Each website 142 is maintained by a content publisher 140, which is an entity that controls, manages and/or owns the website 142.

A resource 145 is any data that can be provided by the publisher 140 over the network 105 and can be associated with a resource address. Resources include HTML pages, word processing documents, and portable document format (PDF) documents, images, video, and feed sources, to name just a few. The resources 145 can include content, such as words, phrases, pictures, and so on, and may include embedded information (e.g., meta information and hyperlinks) and/or embedded instructions, e.g., scripts.

A client device 110 is an electronic device that is capable of communicating over the network 105. Example client devices 110 include personal computers, mobile communication devices, e.g., smart phones, and other devices that can send and receive data over the network 105. A client device 110 can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device 110 can also include a digital media device, e.g., a streaming device that plugs into a television or other display to stream videos to the television, a gaming system, or a virtual reality system.

A client device 110 typically includes applications 112, such as web browsers and/or native applications, to facilitate the sending and receiving of data over the network 105. A native application is an application developed for a particular platform or a particular device, e.g., for mobile devices having a particular operating system. Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

Some resources, application pages, or other application content can include digital component slots for displaying digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page, application content (e.g., an application page), or other resource displayed by the application 112. More specifically, the digital component may include digital content that is relevant to the resource content, e.g., the digital component may relate to the same topic as the web page content, or to a related topic. The provision of digital components can thus supplement, and generally enhance, the web page or application content.

When the application 112 loads a resource (or application content) that includes one or more digital component slots, the application 112 can request a digital component for each slot. In some implementations, the digital component slot can include a tag or code, e.g., one or more scripts, that, when processed by the application 112, cause the application 112 to request a digital component for display to a user of the client device 110. As described below, the application 112 can request digital components from the content management system 150 and/or a content selection module 114 of the client device 110.

The client device 110 includes the content selection module 114 and a trusted hardware module 116. The content selection module 114 is configured to select content, e.g., digital components, for display by the client device 110, e.g., for display by an application 112 running on the client device 110. To select digital components, the content selection module 114 can interact with a cryptographic analysis application 118 that is executed in the trusted hardware module 116. In some implementations, the content selection module 114 is part of the application 114, e.g., an application module of a web browser or native application.

The trusted hardware module 116 is a secure hardware computing device, such as a microcontroller or processor, that performs cryptographic functions and/or executes applications and other functions in an environment secured using cryptography. The trusted hardware module 116 can be in the form of an integrated circuit (IC), plug-in card, or another hardware component that can be installed on or otherwise part of a client device 110. Example trusted hardware modules include Trusted Platform Modules (TPMs) and Hardware Security Modules (HSMs). Trusted hardware modules 116 are typically tamper proof and include protocols that limit access to the applications that run in the trusted hardware module 116.

The trusted hardware module 116 includes the cryptographic analysis application 118, a user attribute data store 120, and a content data store 122. The user attribute data store 120 is stored in the trusted hardware module 116, e.g., in encrypted form, to prevent unauthorized access to user attributes stored in the user attribute data store. The content data store 122 can also be stored in the trusted hardware module 122 or in general data storage of the client device 110, depending on the desired level of data security for the digital components and distribution parameters for the digital components.

In some implementations, the operating system of the client device 110 controls access to the trusted hardware module 116. For example, the operating system can block access to the cryptographic analysis application 118 from any system or component other than the content selection module 114.

The user attribute data store 120, which can be in the form of a database, table, or other appropriate data structure, includes data identifying attributes of the user of the client device 110. The user attributes can include, for the user of the client device 110, personal identifiable information, demographic information (e.g., age, gender, income range, etc.) and location information that indicates a location of the client device 110. In some implementations, the user attributes can include information related to activities of the user, e.g., information identifying websites visited by the user, topics of the websites, keywords obtained from the websites, and/or particular user interactions of the user at the websites. The user attributes that are stored in the user attribute data store 120 can include attributes that enable the identification of traits that align with a specific defined purpose, such as the use case of a particular product/service that is the subject of a digital component.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The content data store 120, which can be in the form of a database, table, or other appropriate data structure, includes data related to digital components, The data for a digital component can include, for example, the digital component itself (e.g., a data file that includes the digital component), a resource locator, e.g., a Universal Resource Locator (URL) or a Uniform Resource Identifier (URI) that indicates a network location where the digital component can be obtained, data identifying the digital component, and/or distribution parameters for the digital component. The distribution parameters for a digital component can include keywords and/or other values, e.g., targeting keywords) that are relevant to the digital component, e.g., to indicate the contexts and environments in which the digital component are to be presented and/or attributes of users to which the digital component should be presented. That is, the distribution parameters for a digital component can define a target profile of a user and context for which the digital component should be displayed. For example, the distribution parameters for a digital component related to football can include gender: men, age: 18-35, location: U.S., interests: sports, football, topic (or URL) of electronic resource: football or sports. In this example, the digital component would be eligible, or more likely, to be displayed to users having attributes that match these distribution parameters.

The data for a digital component can also include an amount that a digital component publisher that published the digital component is willing to provide to an electronic resource publisher if the electronic resource publisher displays the digital component on one of its electronic resources. This amount can be referred to as a publisher amount. In some implementations, the distribution parameters can include a range of values that each correspond to a measure of match between the distribution parameters of the digital component and the user attributes of the user.

The content selection module 114 can request data for digital components from the content management system 150 in response to requests initiated by digital component slots of electronic resources. In some implementations, the content selection module 114 can request data for digital components from the content management system 150 periodically and store the data in the content data store 122. For example, the content selection module 114 can replace digital components that do not match or have a low level of match with (e.g., lower than a specified threshold) the user attributes of the user. In this example, the content selection module 114 can periodically select a specified number of digital components having the lowest measure of match (or that do not match) or each digital component that has less than a threshold measure of match (or that does not match) and remove the data for the selected digital components from the content data store 122. The content selection module 114 can request data for additional digital components to replace those that have been removed. In some implementations, the content selection module 114 may not provide to the content management system 150 data identifying the removed digital components. In this way, the content management system 150 would not be able to infer the user's attributes based on digital components that do not match the user's attributes.

In some implementations, the quantity of distribution parameters must meet or exceed a threshold quantity parameters, to reduce the chance that a party could identify the user's attributes based on the measure of match between distribution parameters and the user's attributes. For example, the threshold quantity can be 25, 50, 100, in the 1000s, or another appropriate quantity. The quantity of user attributes can be on the same or a similar scale.

Stages A-F illustrate an example data flow for selecting and displaying a digital component. In stage A, the application 112 (or content selection module 114) sends a request 161 for one or more digital components to the content management system 150. For example, the request 161 can indicate a quantity of digital components requested. If the request 161 is being sent to request digital components for an electronic resource that is or will be displayed by the client device 110, the quantity can be based on a quantity of digital component slots of the electronic resource. If the request 161 is to replace digital components for which data was previously stored in the content data store 122, the quantity can equal or be based on the quantity removed from the content data store 122. To send the request, the client device 110 can generate a packetized data request including a header and payload data.

In stage B, the content management system 150 selects one or more digital components from a digital content data storage unit 152 and provides a data element 162 that includes data for each digital component. In this example, the data element 162 includes a number "N" digital components and distribution parameters for each digital component. The data element 162 can also include, for each digital component, a publisher amount that a provider of the digital component is willing to provide a publisher of the electronic resource for display of the digital component.

In some implementations, the content management system 150 encrypts the data for each digital component prior to providing the data element 162 to the client device 110. In some implementations, the content management system 150 can encrypt the data for each digital component using the zero-knowledge proof protocol employed by the cryptographic analysis application 118.

In stage C, the application 112 receives the data element 162 and provides a corresponding data element 163 to the content selection module 114. In other implementations, the content selection module 114 can receive the data element 162 rather than the application 112, e.g., when the content selection module 114 sends the request 161.

In stage D, the content selection module 114 interacts with the cryptographic analysis application 118 to select a digital component to display with an electronic resource that is or will be displayed by a web browser application or with content of a native application. The content selection module 114 can identify a set of candidate digital components from which to select a digital component. When the request 161 is sent to the content management system 150 for current digital component presentation opportunity, the candidate digital components can include each digital component referenced by the data element 162. When data for digital components are stored on the client device 110, the candidate digital components can include the digital components for which data is stored in the content selection module 114.

For each candidate digital component, the content selection module 114 provides selection data for the candidate digital component to the cryptographic analysis application 118. This selection data can include the distribution parameters for the candidate digital component. This selection data can also include contextual data related to the context of the environment in which a selected digital component will be displayed. For example, the contextual data can include data related to electronic resource (e.g., web page) or content of a native application with which the digital component will be displayed, the number of digital component slots of the electronic resource or native application, the type of digital component slot (e.g., image or video), the presentation location of the digital component slot within the electronic resource of native application (e.g., top, left, right, bottom, above the fold, below the fold, etc.), the time of day, the day of the week, the date, the geographic location of the client device 110, etc. The data related to the electronic resource of content of the native application can include a topic for the resource/content, a title, keywords extracted from the resource/content, a resource locator (e.g., URL) for the resource, etc.

The content selection module 114 can use a zero-knowledge proof protocol to submit a query to the cryptographic analysis application 118 for each candidate digital component. The query can include the selection data for the candidate digital component. Various zero-knowledge proof protocols can be used. For a zero-knowledge proof to be valid, it must satisfy the three properties of completeness (if the claim is true, the verifier will be convinced of this fact by a prover), soundness (if the claim is false, a cheating prover cannot convince a verifier that it is true, with the exception of a small probability), and zero-knowledge (if the statement is true, the verifier does not learn anything other than the fact that the statement is true).

In some implementations, the content selection module 114 and the cryptographic analysis application 118 uses, as the zero-knowledge proof protocol, ring learning with errors (RLWE). RLWE is a quantum robust cryptographic technique that is based on arithmetic of polynomials with coefficients from a finite field.

In the example of FIG. 1, the content selection module 114 is the verifier and the cryptographic analysis application 118 is the prover. Using zero-knowledge proofs, the content selection module 114 cannot learn anything except whether the distribution parameters of the digital component match the user attributes of the user or the measure of match.

If not already encrypted, the content selection module 114 can encrypt the selection data for the candidate digital component and provide a query 164 that includes the encrypted selection data to the cryptographic analysis application 118. The cryptographic analysis application 118 can compare the encrypted selection data for the candidate digital component to encrypted user attributes stored in the user attributes data store 120. The user attributes can also be encrypted using the same zero-knowledge proof protocol as the selection data for the candidate digital component.

Based on the comparison, the cryptographic analysis application 118 can determine whether the selection data for the digital component match the user attributes of the user. In some implementations, the cryptographic analysis application 118 can output an encrypted value that indicates whether the selection data for the digital component match the user attributes of the user. For example, the output value can be "True" if all data items of the selection data matches a corresponding user attribute or at least a specified threshold or specified percentage of the distribution parameters match its corresponding user attribute, and "False" if not. In a particular example, the output value can be "True" for a candidate digital component when at least 75% of the data items of the selection data match their corresponding user attributes.

In some implementations, the cryptographic analysis application 118 can determine a measure of match between the selection data for a candidate digital component and the user attributes. For example, the measure of match can be based on, e.g., equal to or directly proportional to, a percentage of the data items of the selection data that match their corresponding user attributes. In a particular example, if the gender and geographic location specified for the candidate digital component match the user's gender and geographic location, but the topic of the electronic resource does not match any topics of interest, the measure of match can be ⅔ or 66.7%.

In some implementations, user attributes can be weighted, e.g., based on their importance in digital component selection. In this example, the cryptographic analysis application 118 can determine which data items of the selection data match its corresponding user attribute and determine an aggregate score based on an aggregation (e.g., weighted um or weighted average) of the weighted values for the matching user attributes. The measure of match can be the aggregate score.

In stage E, the cryptographic analysis application 118 outputs, for each candidate digital component, encrypted result data 165 that indicates whether the selection data for the candidate digital component matches the user attributes of the user and/or the measure of match between the selection data and the user attributes. The cryptographic analysis application 118 provides the encrypted result data 118 to the content selection module 116.

In stage F, the content selection module 114 decrypts the encrypted result data 165 to obtain the result data in plaintext and selects, from the candidate digital components, a digital component based at least on the result data for each candidate digital component. For example, if the result data for a candidate digital component indicates whether the selection data for the digital component matches the user attributes of the user, the content selection module 114 can select a digital component from the candidate digital components for which the selection data matches the user attributes of the user. In some implementations, the content selection module 114 can select the matching digital component having the highest corresponding publisher amount that the provider of the digital component is willing to provide to the publisher of the electronic resource or native application with which the selected digital component will be displayed.

If the result data for each candidate digital component indicates a measure of match between the selection data for the candidate digital component and the user attributes of the user, the content selection module 114 can select a digital component based on the measure of match and optionally the publisher amounts for the digital components. As described above, the publisher amount for a digital component can vary based on the measure of match as a digital component provider may be willing to provide a greater publisher amount for the display of digital components to users that match the target profile for the digital component.

In one example, the content selection module 114 can select a digital component having the highest measure of match or the highest publisher amount. In another example, the content selection module 114 can combine the measure of match with the publisher amount for each digital component (e.g., by multiplying the two values) and select the digital component having the product with the greatest value. In another example, the content selection module 114 can filter from the set of candidate digital components each digital component that has a measure of match that is below a specified threshold. The content selection module 114 can then select, from the remaining digital components, the digital component based on their corresponding publisher amounts, e.g., by selecting the digital component having the greatest publisher amount. The threshold can be a predetermined value or the value corresponding to a particular digital component. For example, the content selection module 114 can rank the digital components based on measure of match and set the threshold to the value of the 10th (or another appropriate rank) highest ranking digital component such that the content selection module 114 selects from the top 10 matching digital components.

In some implementations, the content selection module 114 can use additional data when selecting a digital component. For example, the content selection module 114 can use expected performance measures for the digital components, e.g., an expected user interaction rate.

The content selection module 114 provides digital component data 166 for the selected digital component to the application 112. The digital component data can include the digital component itself or a URL for the digital component so that the application 112 can download the digital component. In stage G, the application 112 then displays the selected digital component.

Figure 2:
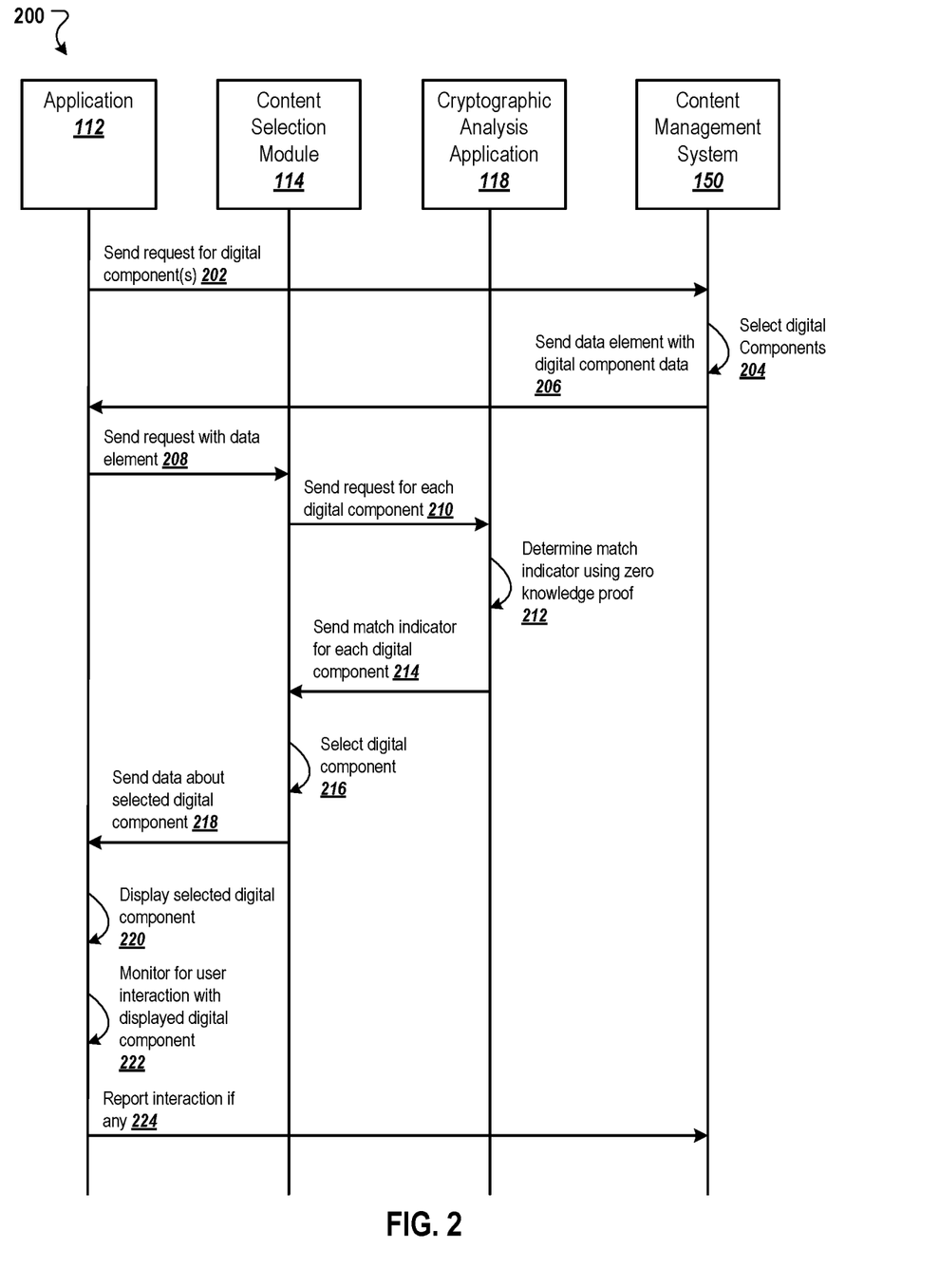
FIG. 2 shows a swim lane diagram of an example process for selecting and displaying a digital component.

FIG. 2 shows a swim lane diagram of an example process 200 for selecting and displaying a digital component. Operations of the process 200 can be implemented, for example, by the application 112, the content selection module 114, the cryptographic analysis application 118, and the content management system 150 of FIG. 1. Operations of the process 200 can also be implemented as instructions stored on one or more computer readable media which may be non-transitory, and execution of the instructions by one or more data processing apparatus can cause the one or more data processing apparatus to perform the operations of the process 200.

The application 112 sends a request for one or more digital components to the content management system (202). The application 112 can send the request based on an electronic resource that is being displayed by the application. In some implementations, the content selection module 114 sends the request to obtain data for digital components to store at the client device 114, e.g., in a local cache of the client device 110.

The content management system 150 selects one or more digital components (204). The content management system 150 sends a data element that includes data for the digital components to the application 112 or to the content selection module 114 (206). As described above, the data for a digital component can include distribution parameters and a publisher amount that the provider of the digital component is willing to provide to a publisher for display of the digital component with an electronic resource or native application of the publisher. In some implementations, the data for a digital component includes a range of publisher amounts or a set of publisher amounts that can be selected from based on a measure of match between selection data for the digital component and user attributes of a user. The data for each digital component can be encrypted according to a zero-knowledge proof protocol employed by the cryptographic analysis application 118.

The application 112 sends, to the content selection module 114, a request to select a digital component for display by the application 112 (208). The request can include the data element received from the content management system 150.

The content selection module 114 sends, to the cryptographic analysis application 118, a request for a match analysis to be performed for each of multiple candidate digital components (210). As described above, the request, which can be in the form of a query, includes encrypted selection data for the candidate digital component. The selection data, which can include distribution parameters for the digital component and contextual data, can be encrypted using the zero-knowledge proof protocol used by the cryptographic analysis application 118.

The cryptographic analysis application 118 determines whether the selection data matches user attributes of a user and/or determines a measure of match between the selection data and the user attributes (212). The cryptographic analysis application 118 uses the zero-knowledge proof protocol to compare the encrypted selection data for the candidate digital component to encrypted user attributes of a user of the client device 110, e.g., a user of the application 112. As described above the cryptographic analysis application 118 can run in a trusted hardware module 116 and perform cryptographic functions in the trusted hardware module 116.

The cryptographic analysis application 118 sends, to the content selection module 114, a match indicator for each candidate digital component (214). The match indicator can be an encrypted result output by the cryptographic analysis application 118. The match indicator can indicate whether the selection data for the candidate digital component matches the user attributes of the user and/or the measure of match between the selection data for the candidate digital component.

The content selection module 114 selects, from the candidate digital components, a digital component for display by the application 112 (216). The content selection module 114 can decrypt the match indicator for each candidate digital component and select the digital component based at least in part based on the match indicator. As described above, the content selection module 114 can select the digital component based on whether each candidate digital component matches the user attributes of the user (e.g., whether the selection data matches the user attributes), the measure of match for each candidate digital component, the publisher amounts for each candidate digital component, and/or other data.

The content selection module 114 sends, to the application 112, data about the selected digital component (218). This data can include the digital component itself of a resource locator to obtain the selected digital component.

The application 112 displays the selected digital component (220). The application 112 can display the digital component in a digital component slot of the electronic resource or native application.

The application 112 monitors for user interaction with the displayed digital component (222). If a user interaction is detected, the application 112 can report the user interaction to the content management system 150 (224). In some implementations, the application 112 can interact with the cryptographic analysis application 118, e.g., via the content selection module 114, to encrypt a notification that includes data indicating the user interaction. The application 112 can then send the encrypted notification to the content management system 150. Similarly, the application 112 can monitor for a conversion event and send an encrypted notification for any detected conversion event.

In some implementations, the cryptographic analysis application 118 encrypts the notifications using the zero-knowledge proof protocol. In some implementations, the cryptographic analysis application 118 encrypts the notifications using an encryption key or signature based on the client device. However, the use of device-specific keys or signatures may enable other entities to identify the user, e.g., similar to a device identifier. Using the zero-knowledge proof ensures that the user's identity is hidden from observation.

In addition, using the cryptographic analysis application 118 to encrypt the notifications related to user interactions proves that a user is involved in the sequence of events, which is super important because it helps prevent attacks like click fraud by providing attestation of real user interaction. Essentially, a challenge is given that has been validated by user interaction (a protected OS function that cannot be interacted with via a thread or other automated process, but only from a privileged input such as touching the screen, etc.).

Figure 3:
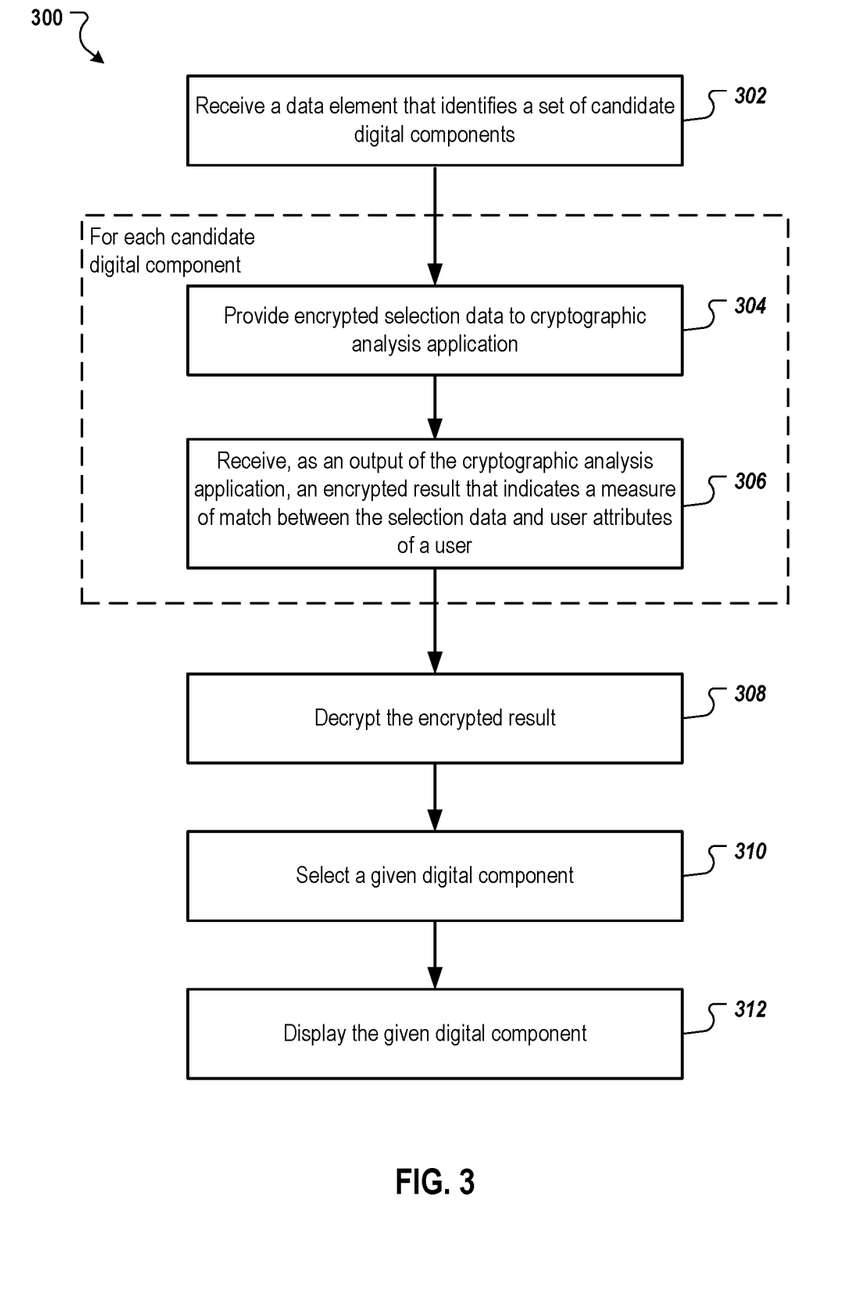
FIG. 3 is a diagram of an example process for selecting and displaying a digital component.

FIG. 3 is a diagram of an example process 300 for selecting and displaying a digital component. Operations of the process 300 can be implemented, for example, by a client device, e.g., the client device 110 of FIG. 1. Operations of the process 300 can also be implemented as instructions stored on one or more computer readable media which may be non-transitory, and execution of the instructions by one or more data processing apparatus can cause the one or more data processing apparatus to perform the operations of the process 300.

The client device receives a data element that identifies one or more candidate digital components (302). The data element can include data for each candidate digital component. The data for each candidate digital component can include the digital component itself, a resource locator for obtaining the candidate digital component, distribution parameters for each digital component, and a publisher amount that a provider of the candidate digital component is willing to provide a publisher of the electronic resource for display of the candidate digital component. The data for each digital component can be encrypted using a zero-knowledge proof protocol that is used by a cryptographic analysis application.

For each digital component, the client device provides encrypted selection data as an input to the cryptographic analysis application (304). As described above, the cryptographic analysis application can run in a trusted hardware module of the client device. The encrypted selection data can represent the set of distribution parameters for the candidate digital component and can be encrypted using the zero-knowledge proof protocol used by the cryptographic analysis application. As described above, the selection data for a candidate digital component can also include contextual data for an environment in which a selected digital component will be displayed.

In some implementations, the client device receives a collection of distribution parameters for multiple digital components. The collection can be encrypted together or the distribution parameters for each digital component can be encrypted separate from each other digital component. A content management system can select multiple digital components to include in the collection, e.g., based on a resource, such as a web page, that has been requested by the client device of the user. The client device provides the distribution parameters for the collection to the cryptographic analysis application for use in selecting a digital component to display to the user at the client device.

The cryptographic analysis application is configured to determine a measure of match between the selection data and user attributes of a user of the client device. The user attributes can be stored in the trusted hardware module, as described above. The cryptographic analysis application can determine the measure of match between the selection data and user attributes by comparing each data item of the selection data to a corresponding user attribute of the user.

For each candidate digital component, the client device (e.g., a content selection module of the client device) receives, as an output of the cryptographic analysis application, an encrypted result that indicates the measure of match between the selection data and the user attributes of a user (306). The encrypted result can be encrypted using the zero-knowledge proof protocol of the cryptographic analysis application.

The client device decrypts the encrypted result for each candidate digital component (308). A content selection module of the client device can decrypt the encrypted result using the zero-knowledge protocol of the cryptographic analysis application.

The client device selects, from the candidate digital components, a given digital component based on the measure of match for each candidate digital component (310). As described above a content selection module of the client device can select a digital component based on the measure of match for each candidate digital component and a publisher amount for each candidate digital component.

The client device displays the given digital component (312). For example, an application running on the client device can display the given digital component in a digital component slot of an electronic resource, e.g., web page, being displayed by a display of the client device.

Figure 4:
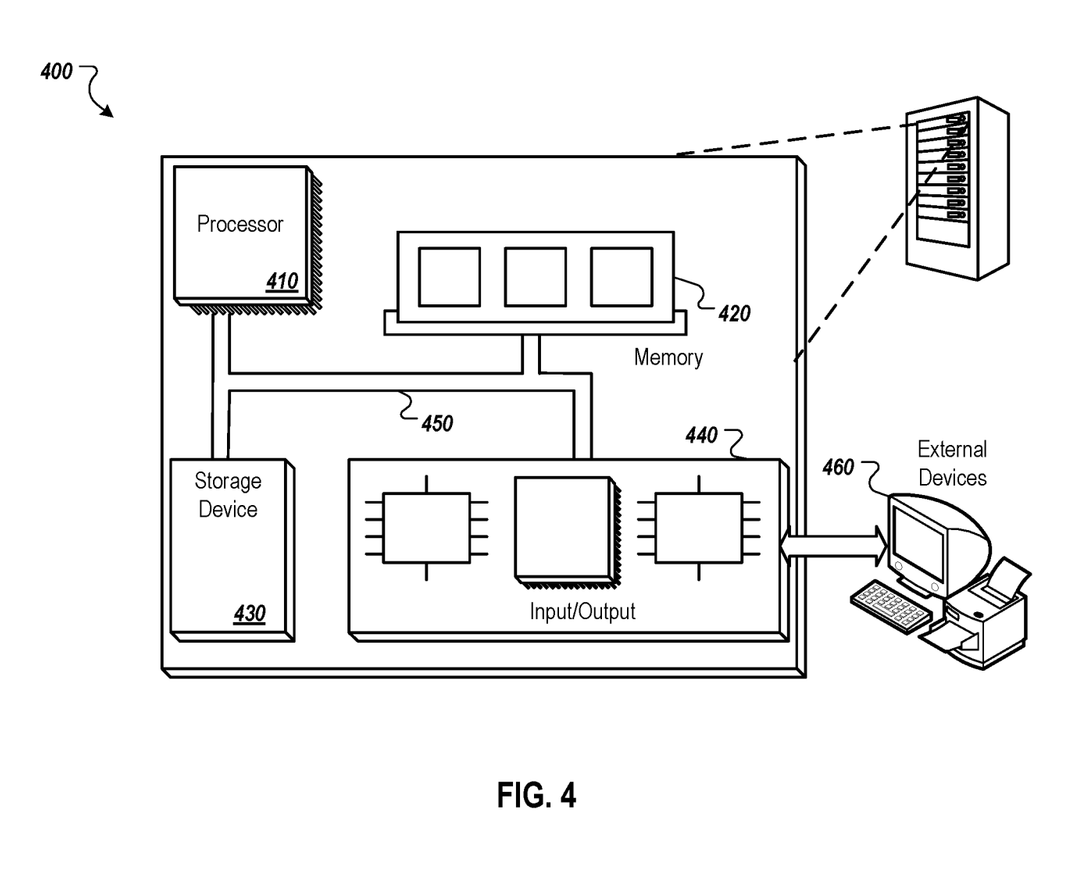
FIG. 4 is a block diagram of an example computer system.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 460, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internet (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    receiving a data element identifying a set of candidate digital components and, for each candidate digital component, a set of distribution parameters for the candidate digital component;
    for each candidate digital component,
        providing encrypted selection data for the candidate digital component as input to a cryptographic analysis application running in a trusted hardware module of a client device, wherein the encrypted selection data represents the set of distribution parameters for the candidate digital component and is encrypted using a zero-knowledge proof protocol, and wherein the cryptographic analysis application is configured to determine a measure of match between the selection data and user attributes of a user of the client device, and receiving, as an output of the cryptographic analysis application, an encrypted result that indicates the measure of match between the selection data and the user attributes of a user, wherein the encrypted result is encrypted using the zero-knowledge proof protocol;

decrypting the encrypted result for each candidate digital component;

selecting, from the candidate digital components, a given digital component based on the measure of match for each candidate digital component; and displaying the given digital component.

2. The computer-implemented method of claim 1, wherein the cryptographic analysis module determines the measure of match between the selection data and user attributes by comparing each data item of the selection data to a corresponding user attribute of the user.

3. The computer-implemented method of claim 1, wherein the selection data for each candidate digital component comprises contextual data for an environment in which a selected digital component will be displayed.

4. The computer-implemented method of claim 1, wherein the user attribute data is stored in the trusted hardware module and the user attribute data is encrypted using the zero-knowledge protocol.

5. The computer-implemented method of claim 1, wherein the set of distribution parameters for each candidate digital component is encrypted using the zero-knowledge proof protocol.

6. The computer-implemented method of claim 1, wherein the zero-knowledge proof protocol comprises a ring learning with errors protocol.

7. The computer-implemented method of claim 1, wherein selecting, from the candidate digital components, the given digital component based on the measure of match for each candidate digital component comprises selecting the given digital component based on, for each candidate digital component, a combination of the measure of match and a publisher amount.

8. A system comprising:
one or more processors; and
one or more storage devices storing instructions that, when executed by the one or more processors, cause the one or more processors perform operations comprising:
receiving a data element identifying a set of candidate digital components and, for each candidate digital component, a set of distribution parameters for the candidate digital component;
for each candidate digital component,
providing encrypted selection data for the candidate digital component as input to a cryptographic analysis application running in a trusted hardware module of a client device, wherein the encrypted selection data represents the set of distribution parameters for the candidate digital component and is encrypted using a zero-knowledge proof protocol, and wherein the cryptographic analysis application is configured to determine a measure of match between the selection data and user attributes of a user of the client device, and
receiving, as an output of the cryptographic analysis application, an encrypted result that indicates the measure of match between the selection data and the user attributes of a user, wherein the encrypted result is encrypted using the zero-knowledge proof protocol;

decrypting the encrypted result for each candidate digital component;

selecting, from the candidate digital components, a given digital component based on the measure of match for each candidate digital component; and displaying the given digital component.

9. The system of claim 8, wherein the cryptographic analysis module determines the measure of match between the selection data and user attributes by comparing each data item of the selection data to a corresponding user attribute of the user.

10. The system of claim 8, wherein the selection data for each candidate digital component comprises contextual data for an environment in which a selected digital component will be displayed.

11. The system of claim 8, wherein the user attribute data is stored in the trusted hardware module and the user attribute data is encrypted using the zero-knowledge protocol.

12. The system of claim 8, wherein the set of distribution parameters for each candidate digital component is encrypted using the zero-knowledge proof protocol.

13. The system of claim 8, wherein the zero-knowledge proof protocol comprises a ring learning with errors protocol.

14. The system of claim 8, wherein selecting, from the candidate digital components, the given digital component based on the measure of match for each candidate digital component comprises selecting the given digital component based on, for each candidate digital component, a combination of the measure of match and a publisher amount.

15. A non-transitory computer readable storage medium carrying instructions that, when executed by one or more processors, cause the one or more processors to perform operations comprising:
receiving a data element identifying a set of candidate digital components and, for each candidate digital component, a set of distribution parameters for the candidate digital component;
for each candidate digital component,
providing encrypted selection data for the candidate digital component as input to a cryptographic analysis application running in a trusted hardware module of a client device, wherein the encrypted selection data represents the set of distribution parameters for the candidate digital component and is encrypted using a zero-knowledge proof protocol, and wherein the cryptographic analysis application is configured to determine a measure of match between the selection data and user attributes of a user of the client device, and
receiving, as an output of the cryptographic analysis application, an encrypted result that indicates the measure of match between the selection data and the user attributes of a user, wherein the encrypted result is encrypted using the zero-knowledge proof protocol;

decrypting the encrypted result for each candidate digital component;

selecting, from the candidate digital components, a given digital component based on the measure of match for each candidate digital component; and displaying the given digital component.

16. The non-transitory computer readable storage medium of claim 15, wherein the cryptographic analysis module determines the measure of match between the selection data and user attributes by comparing each data item of the selection data to a corresponding user attribute of the user.

17. The non-transitory computer readable storage medium of claim 15, wherein the selection data for each candidate digital component comprises contextual data for an environment in which a selected digital component will be displayed.

18. The non-transitory computer readable storage medium of claim 15, wherein the user attribute data is stored in the trusted hardware module and the user attribute data is encrypted using the zero-knowledge protocol.

19. The non-transitory computer readable storage medium of claim 15, wherein the set of distribution parameters for each candidate digital component is encrypted using the zero-knowledge proof protocol.

20. The non-transitory computer readable storage medium of claim 15, wherein the zero-knowledge proof protocol comprises a ring learning with errors protocol.

* * * * *